July 21, 1959        R. W. GILBERT ET AL        2,896,166
CURRENT MEASURING SYSTEM
Filed Nov. 7, 1955

ROSWELL W. GILBERT
and JOHN H. MILLER
INVENTORS

BY
Rudolph J. Jurick
ATTORNEY

United States Patent Office 2,896,166
Patented July 21, 1959

2,896,166

CURRENT MEASURING SYSTEM

Roswell W. Gilbert, Montclair, and John H. Miller, Short Hills, N.J., assignors, by mesne assignments, to Daystrom, Incorporated, Murray Hill, N.J., a corporation of New Jersey Application November 7, 1955, Serial No. 545,437

3 Claims. (Cl. 324—140)

This invention pertains to a system for totalizing and measuring the current in each of a plurality of feeder branches of a D.-C. power system to provide an indication of the total current flowing in the main bus.

In high power direct current installations, such as in electrochemical process plants, it is often desired to totalize the direct current flowing in several branch circuits. For example, a number of rectifier units feeding a main D.-C. bus may require individual metering of the separate rectifier feeders and total metering of the bus current. If the current flowing in individual shunts inserted in the feeder lines can be totalized effectively, the use of an expensive main bus shunt suitable for measuring the total bus current may be avoided thereby effecting a considerable cost saving.

Heretofore, a Kelvin-bridge type of arrangement has been utilized to effect a totalization of several feeder currents without influence of the bus potentials existing between shunts. This method, however, becomes increasingly impractical in installations wherein the intershunt potentials are high with respect to the potentials across the shunts proper. The bridge ratio arms must be made more precise than the required accuracy of indication by a factor equal to the ratio of the intershunt potential to the shunt potential. Furthermore, the bridge ratio arms require the use of calibrated connecting leads, or the arms must be made so high in resistance that the usual type of direct indicating instrument is ruled out.

Similarly, a single total bus current instrument connected to separate feeder line shunts will have an indication which will be affected by the potential drop between each individual shunt. Since the points where the individual feeders are connected to the main bus are often 15 to 30 feet apart, and in view of the large current flow in the main bus, such potential drop can be very significant.

The system to be described in detail hereinbelow overcomes the limitations and objections of prior systems by utilizing direct current amplifiers individually connected to separate shunts inserted in the feeder lines. Each amplifier is provided with a feedback circuit, and the current outputs of the amplifiers are totalized in a direct reading instrument. The buffering action of the amplifiers makes it possible to apply the intershunt potentials to the amplifier output circuits only, without effect upon the amplifier input circuits. Thus, the intershunt potentials are completely resolved up to the limit of the amplifiers' abilities to balance against the intershunt potentials within their output circuits. Briefly stated, the system utilizes the pure transfer characteristic of a full feedback amplifier, which is not possible with passive circuits.

An object of this invention is the provision of an improved system for totalizing the individual currents flowing in various branch circuits of a D.-C. power system.

An object of this invention is the provision of a D.-C. shunt totalizing system utilizing full-feedback amplifiers to eliminate the adverse effects of currents flowing as a result of intershunt potentials.

A more specific object of this invention is to provide a D.-C. current totalizing system utilizing a shunt in each branch feeder circuit, a D.-C. feedback amplifier associated with each shunt, means for applying the intershunt potentials to the output circuits of the amplifiers, and a D.-C. instrument for indicating the sum of the individual currents flowing in the branch circuits.

These and other objects and advantages of the invention will become apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views.

Figure 1:
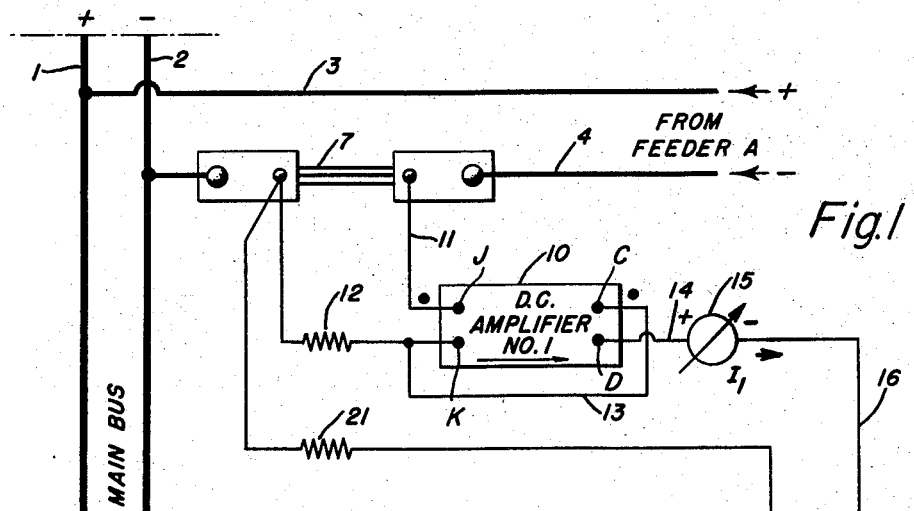
Figure 1 is a schematic diagram of our shunt totalizing system.

Referring now to Figure 1 of the drawings, the main bus bars 1 and 2 carry the total current which, in certain installations may be of the order of 120,000 amperes. Such current is supplied by individual branch feeders A and B through the bus bars 3, 4 and 5, 6, respectively. Although only two branch feeders are shown in the drawing the system is adapted for use with any number of feeders. Thus, in this particular application, twelve branch feeders may be utilized in which case the current flowing in each of the feeders may be 10,000 amperes. Individual current shunts 7 and 8, of conventional design, are inserted into the bus bars 4 and 6, respectively, of the branch feeders A and B. The voltage drop developed across the potential terminals of the shunt 7 is applied to the input terminals, designated J and K, of a direct current amplifier 10 through the lead 11 and a feedback resistor 12, respectively, the latter being connected to the amplifier output circuit by the lead 13. The Gilbert Patent No. 2,744,168, dated May 1, 1956, owned by the assignee of the present application, and based on an application filed January 21, 1952, discloses a direct current amplifier as an example only of what may be represented by the reference characters 10 and 22. Any direct current amplifier may be employed. The amplifier output current $I_1$, flows through the lead 14, direct current indicating instrument 15, leads 16, 17, direct current indicating instrument 18, leads 19, 20, isolating resistor 21, feedback resistor 12 and lead 13. Thus, by passing the amplifier output current through the feedback resistor 12, the amplifier is arranged to maintain a potential balance against the voltage drop across the associated shunt 7. The output terminals of the amplifier 10 are designated C and D.

The potential drop developed across the shunt 8 is applied to the input terminals, designated E and F, of a second, direct current amplifier 22 through the lead 23 and the feedback resistor 24, respectively, the latter being connected to the amplifier output circuit by the lead 25. In this case, the amplifier output current $I_2$ flows through the loop consisting of the lead 26, direct current indicating instrument 27, lead 17, instrument 18, lead 28, isolating resistor 29, lead 30, feedback resistor 24 and lead 25. Consequently, the amplifier 22 is arranged to maintain a potential balance against the voltage drop across the shunt 8.

It is clear, then, that the individual output currents of the amplifiers 10, and 22 flow through the instruments 15 and 27, respectively, and that the summation of these output currents flows through the totalizing instrument 18. Each of these instruments may be provided with suitably calibrated scales whereby there are provided direct readings of the individual branch feeder currents and the total of the current flowing in the main bus.

The intershunt potentials cause circulating currents to flow through the isolating resistors 21 and 29 but the potential drops across these resistors appear in series with the output currents of the individual amplifiers. These potentials are, therefore, ineffective up to functional limits of the amplifiers to deliver load voltage since the system utilizes the pure transfer characteristic of a full feedback amplifier and such amplifier is substantially unaffected by potentials appearing within its own gain loop.

The values of the isolating resistors 21 and 29 need be only approximate as these resistors determine only the distribution of the potential burden to the various amplifiers. Such resistors do not, in any sense, enter into the calibration of the system.

The only circuit peculiarity is the three-lead junction of the feedback resistor 12, the isolating resistor 21 and one terminal of the shunt 7, and their equivalents associated with the amplifier 22. This is because the two currents, the current in bus 4 and the current in resistor 12 should feed into the point determining the mutual values of both the resistor 12 and the resistance of the shunt 7. The mutual value of resistor 12 is, then, the resistance up to the point of junction at the potential terminal of the shunt. However, the customary potential drop of a shunt is 50 millivolts and the usual amplifier output is 1 milliampere. Hence, the feedback resistors 12 and 24 will each be 50 ohms, which is high enough to minimize lead resistances and such. In cases where the shunt ranges are unequal, the larger shunt will require a 50 ohm resistor and the other shunts will require resistors of larger values to conform to the equation:

$$\frac{R_1}{S_1} = \frac{R_2}{S_2} \ldots = \frac{R_N}{S_N} = \text{constant}$$

where:

$R_1$, $R_2$ = the resistance of individual feedback resistors,
$R_N$ = total resistance of all feedback resistors,
$S_1$, $S_2$ = the resistance of individual shunts, and
$S_N$ = the total resistance of all shunts.

In a system utilizing 50 millivolt shunts, the resolution of conventional, high quality amplifiers is sufficient for reasonable overall system precision. A resolution of 5 microvolts, or one part in 10,000 at the 50 millivolt level, will provide a system precision that is better than the practical order of precision of the feedback resistors under service conditions for long time periods. Further, indicating milliammeters, as utilized in our system, are more precise and have less temperature complications than millivoltmeters. Hence, the overall performance of our feedback amplifier system is better than that of conventional systems heretofore used for this particular purpose. Large current shunts are expensive and the elimination of a large totalizing shunt more than offsets the cost of the amplifiers.

Figure 2:
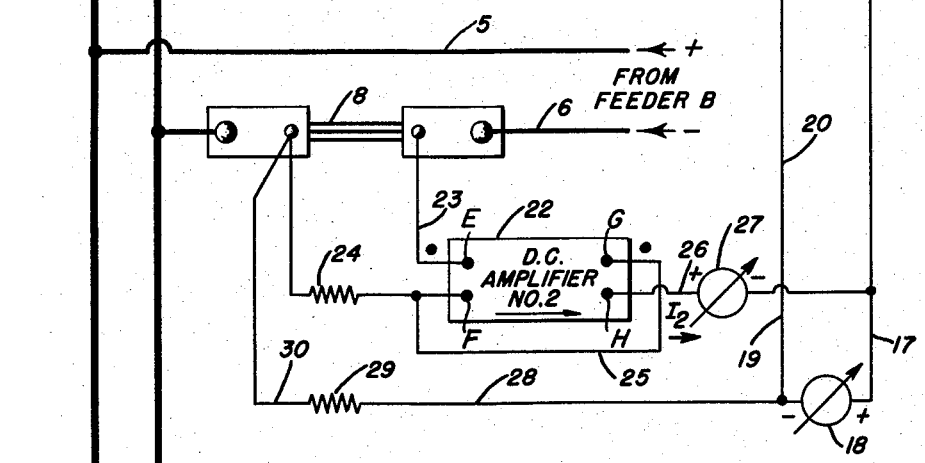
Figure 2 is a simplified diagram of a prior art D.-C. amplifier which may be used in the system of Figure 1.

While the description of the invention has been restricted to a power system wherein a plurality of feeder branches supply currents to the main bus, it will be apparent that the system is equally applicable to a reverse arrangement, that is, one wherein the main bus constitutes the source of a large current that is distributed to a plurality of branch lines. Also, the illustrated system is not limited to the addition of the individual feeder currents in the totalizing instrument 18. By reversing the potential leads connected to selected shunts, the totalizing instrument 18 will provide an indication representing the arithmetrical summation of any number of branch circuits. Reference is now made to Figure 2 of the drawings wherein there is shown a prior art D.-C. amplifier of the type which may be used in our shunt totalizing system. The D.-C. amplifier includes input terminals 40 and 41 and output terminals 42 and 43. The D.-C. input to the amplifier is fed to an input converter, or modulator, 44 energized by a suitable A.-C. source. The alternating current output from the input converter is fed through lead wire 46 to the input of an A.-C. amplifier 47. The A.-C. amplifier output, taken from transformer 48 is fed to the input of an output converter, or demodulator, 49 through lead wires 51 and 52. The demodulated output from the output converter 49 provides an output from the amplifier. The input and output converters 44 and 49, respectively, are actuated synchronously by a suitable 60 cycle A.-C. source.

If prior art D.-C. amplifiers of the type shown in Figure 2 are used in the novel system of our invention shown in Figure 1, the input terminals 40 and 41 would correspond to the input terminals J and K, respectively, of the amplifier 10, while the output terminals 42 and 43 would correspond to the output terminals C and D, respectively. In a similar manner, the input terminals 40 and 41 would correspond to the input terminals E and F, respectively, of the amplifier 22, while the output terminals 42 and 43 would correspond to the output terminals G and H, respectively. As mentioned above, it will be apparent that the D.-C. amplifier illustrated in Figure 2 forms no part of my invention, and is only an example of an amplifier which may be used for the D.-C. amplifiers 10 and 22. It will be understood by those skilled in this art that any suitable direct current amplifier may be used.

Having now described our invention in detail in accordance with the requirements of the patent statutes what we desire to protect by Letters Patent of the United States, is set forth in the following claims:

We claim:

1. A system for measuring the summation of the direct currents flowing in a plurality of branch lines connected to a main line, said system comprising individual current shunts inserted in each branch line, a direct current amplifier associated with each shunt, each amplifier having its input circuit energized by the potential drop across the associated shunt by a lead from each end thereof, a feedback resistor in one of said leads, a lead connecting said resistor to one of the amplifier output terminals, individual isolating resistors each having one end connected to a common junction and the other end connected to a potential terminal of the associated shunt, and a direct current indicating instrument having one side connected to the common junction of the isolating resistors and the other side connected to the other output terminal of each amplifier.

2. The invention as recited in claim 1, including additional direct current indicating instruments associated with each amplifier, each such instrument being connected between the output terminal of the associated amplifier and the said other side of the first said indicating instrument.

3. A system for measuring the summation of the direct currents flowing in two branch lines connected to a main bus at spaced points, said system comprising a first current shunt inserted into the first branch line, a first direct current amplifier, a lead connecting one input terminal of the first amplifier to one potential terminal of the first shunt, a first feedback resistor connected between the other input terminal of the first amplifier and the other potential terminal of the first shunt, a lead connecting the said other input terminal of the first amplifier to one amplifier output terminal, a second current shunt inserted into the second branch, a second direct current amplifier, a lead connecting one input terminal of the second amplifier to one potential terminal of the second shunt, a second feedback resistor connected between the other input terminal of the second amplifier and the other potential terminal of the second shunt, a lead connecting the said other input terminal of the second amplifier to one amplifier output terminal, a first isolating resistor connected to the said other potential terminal of the first shunt, a second isolating resistor connected to the said other potential terminal of the second shunt, and a direct current indicating instrument having one side connected to each of the other output terminals of the amplifiers and the other side connected to each of the said isolating resistors.

References Cited in the file of this patent

UNITED STATES PATENTS 2,715,209   Williams et al. _____ Aug. 9, 1955